Nov. 22, 1955       W. A. WIGHT       2,724,289
COUPLING APPARATUS
Filed April 27, 1954
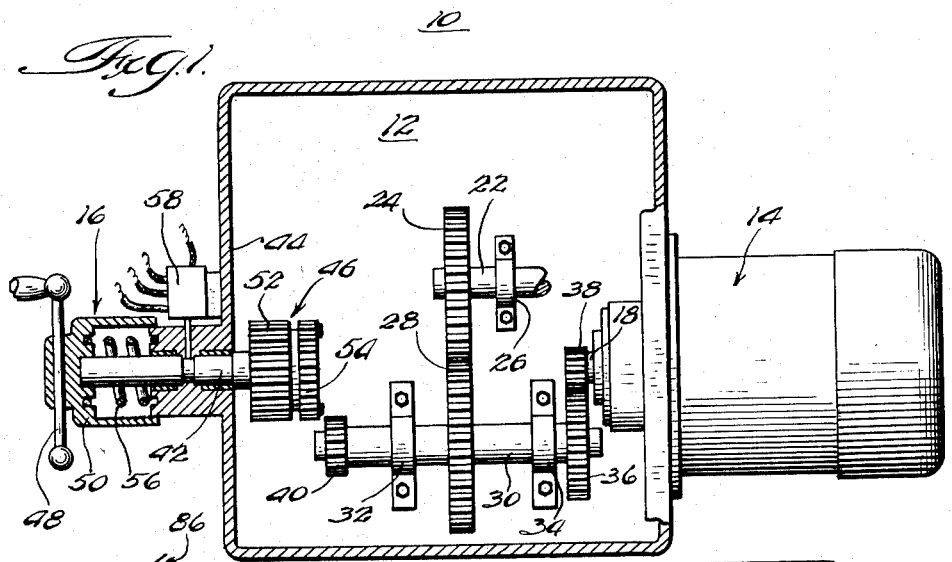
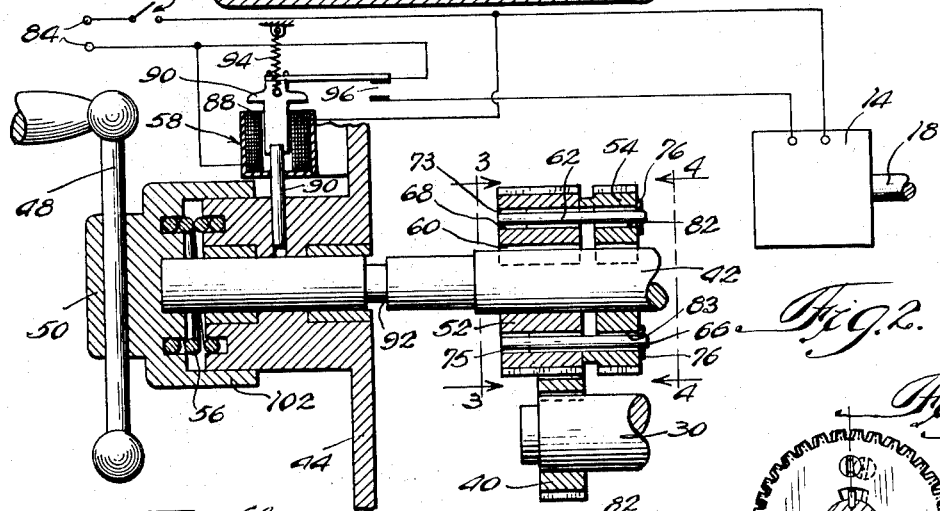
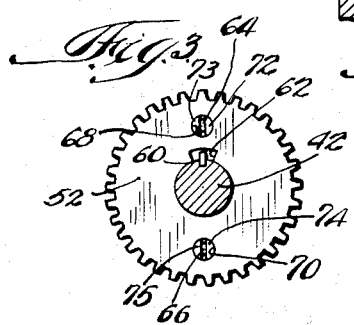
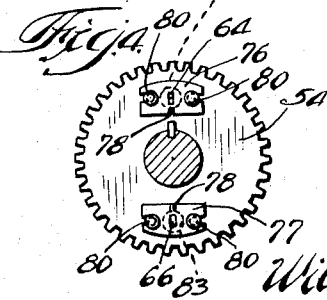
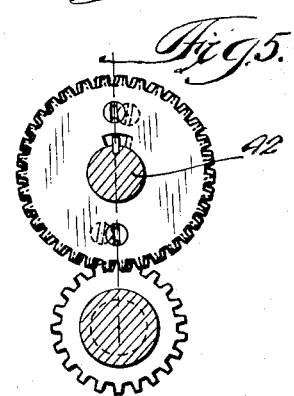
INVENTOR.
William A. Wight.
BY
Thiess, Olsen, Mecklenburger,
von Holst, & Coltman. Attys.

United States Patent Office 2,724,289
Patented Nov. 22, 1955

2,724,289

COUPLING APPARATUS

William A. Wight, Hinsdale, Ill., assignor to Janette Electric Mfg. Co., Morton Grove, Ill., a corporation of Michigan Application April 27, 1954, Serial No. 425,873

14 Claims. (Cl. 74—625)

This invention relates to coupling apparatus and more particularly to improved apparatus for alternately applying two driving means to a load, and maintaining an associated pair of spur gears in engagement while torque is being transmitted therebetween and to insure disengagement of the associated gears when the torque is reduced below a predetermined minimum.

It is a principal object of this invention to provide improved gear locking means to maintain a pair of axially shiftable spur gears in engagement when torque is being transmitted therebetween.

It is another principal object of this invention to provide improved coupling means for applying two driving means to a load in the alternative, one of said means being an automatically disengaged manual drive.

In industrial uses of power it is frequently desirable to provide a given load with both a manual driving means and a power source, such as an electric motor or the like. It is desirable that the manual driving means be automatically disconnected from the load whenever the motor is energized and, conversely, it is desirable to prevent energization of the motor during manual operation. One particular example of the use of such a dual drive is in the operation of a valve gate. An automatic means is generally provided for operating the valve gate between an open and a closed position but a hand wheel is further provided to operate the valve gate in the event of power failure or excessive wedging of the gate whereby the electric motor cannot develop sufficient torque to operate the valve. If the manual means remains engaged with the load at all times it will be driven violently when the valve gear is electrically operated and may result in injury both to the equipment and operator.

It is therefore a further object of this invention to provide improved coupling apparatus for transmitting torque between an input and output gear and to automatically disengage said gears when the torque ceases.

It is a further object of this invention to provide an improved spur gear locking means which is safe and simple to operate.

It is a further object of this invention to provide improved gear locking means having few moving parts and thus being inexpensive and easy to maintain.

Further and additional objects of this invention will become obvious from a consideration of this specification, the accompanying drawings and the appended claims.

In one form of this invention an output spur gear is rotatably mounted in a housing and adapted to be driven by an electric motor which is in continuous engagement therewith, and is further adapted to be driven by a manually operated gear which is normally disengaged from the output but may be engaged therewith by axial motion of the manual means. More particularly the manual means comprises an associated spur gear set, one gear of which is relatively shiftable through a small angle whereby the teeth are offset a fraction of the circular pitch thereof when torque is applied thereto whereby disengagement is prevented as long as the torque persists.

For a more complete understanding of this invention reference will be made to the accompanying drawings wherein:

Fig. 1 is a sectional view of a driving mechanism employing coupling apparatus constituting one embodiment of this invention;

Fig. 2 is a partial sectional view of the embodiment of Fig. 1 including an electrical schematic diagram;

Fig. 3 illustrates the driving gear of the embodiment of Fig. 2 taken along the line 3—3 thereof;

Fig. 4 illustrates the locking gear of the embodiment of Fig. 2 taken along the line 4—4 thereof; and Fig. 5 diagrammatically illustrates the locking action between the driving, locking and driven gears in the embodiment of Fig. 2.

Referring now to the drawings and more particularly to Fig. 1, a driving mechanism 10 is illustrated comprising generally a gear box 12 having an electric motor 14 and a manual drive 16 connected thereto. The output of the entire system is diagrammatically indicated as a broken output shaft 22 having a spur gear 24 fixed thereto. The shaft 22 is rotatably mounted in an appropriate bearing 26 and spur gear 24 is in continuous engagement with an associated spur gear 28 fixed to shaft 30. Shaft 30 is rotatably mounted in bearings 32 and 34. At one end of shaft 30 a spur gear 36 is mounted for engagement by a pinion 38 which is secured to armature shaft 18 and comprises the output of electric motor 14. Through the series of gears just described it will be clear that the motor 14 is in continuous driving engagement with the output shaft 22.

At the other end of intermediate shaft 30 a pinion 40 is fixed, said pinion not being normally engaged by any driving means. However, manually operated shaft 42 is rotatably mounted in housing 44 in parallel spaced relationship to the shaft 30 whereby the teeth of a gear set 46 mounted on shaft 42 align with the corresponding teeth of gear 40 but are axially spaced therefrom. A hand wheel 48 is secured in a hub 50 which is fixed on the free end of shaft 42 and is engaged and rotated by an operator to effect manual actuation of the gears. The hand wheel is first depressed to the right in Fig. 1 whereby the shaft 42 slides in housing 44 and gear set 46 engages the gear 40. Gear set 46 is comprised of a driving gear 52 and a locking gear 54. The hand wheel is depressed sufficiently to cause locking gear 54 to extend to the right of output gear 40, whereby driving gear 52 comes into engagement therewith. As will be clear from the description to follow, rotation of the hand wheel 48 will produce a slight rotation or angular shifting of driving gear 52 with respect to locking gear 54 and therefore while driving torque is maintained on the wheel the gears are not free to disengage. The gears are normally urged toward disengagement by a coil spring 56 which is compressed between the housing 44 and the hand wheel hub 50. A solenoid 58 is provided to prevent operation of the hand wheel under certain conditions which will be clear from the electrical diagram of Fig. 2.

Referring now to Fig. 2, the manually operated portions of the embodiment of Fig. 1 are illustrated in detail. In Fig. 2 the manual driving gear 52 is shown in engagement with the output gear 40 and the locking gear 54 is shown extending therebeyond. The locking gear 54 is rigidly keyed to the shaft 42 whereby relative rotation therebetween is prevented. However, the driving gear 52 is provided with a key 60 which is fixed in the shaft 42 but occupies a keyway 62 formed in driving gear 52 which includes an angle substantially larger than that required for key 60. Thus driving gear 52 is free to move through a predetermined angle of rotation with respect to shaft 42. The freedom thus provided is bilateral, thus making the apparatus operable in both directions. The driving gear 52 and locking gear 54 are normally maintained in aligned relationship by a pair of flat springs 64 and 66 extending through corresponding apertures in the two gears. The gears are so aligned that the individual teeth thereof also align and thus upon axial movement of shaft 42, the locking gear 54 will freely pass relative to the output gear 40 permitting the driving gear 52 to come into engagement therewith.

As shown more clearly in Figs. 3 and 4, each of the flat springs 64 and 66 are fixed in driving gear 52 by a forced or drive fit in round apertures 68 and 70. A pair of semicylindrical wedges 72, 73 and 74, 75 respectively are employed to lock the springs 64 and 66 in place. The flat springs 64 and 66 extend through the driving gear 52 and the locking gear 54 and are engaged by a pair of identical adjusting plates 76 and 77 mounted on the outer face of locking gear 54. The adjusting plates 76 and 77 have slots formed therein to receive the associated flat springs 64 and 66. Locking gear 54 has two threaded apertures in each half thereof, said apertures being disposed on opposite sides of flat springs 64 and 66. Screws 80 are engageable with these threaded apertures to clamp slotted portions of the adjusting plates 76 and 77 against locking gear 54 and thus determine the exact position of the flat springs in the apertures 82 and 83 of the locking gear. The apertures 82 and 83 are selected to pass the flat springs 64 and 66 freely therethrough whereby substantial flexing of the flat springs is possible to permit relative movement of the driving gear 52 and locking gear 54. Though any shifting which exceeds the backlash clearance of the gears is sufficient, this relative movement, as illustrated in Fig. 5, is preferably approximately one-half the circular pitch of the gear teeth so that during torque transmission the teeth of the driving and locking gears respectively are offset by approximately the width of one tooth. Thus, the force of coil spring 56 cannot effect disengagement of the gears utnil the entire system is relieved of the applied torque.

Without the locking system just described, an operator finds it necessary to apply not only rotary force to the handle 48 but also to continuously apply axial force thereto to maintain the gears in engagement. By the teaching of this invention an inital axial force is applied to the handle to effect engagement of the gears, after which engagement is maintained as long as a rotary force is applied to the handle. The circuitry illustrated in Fig. 2 insures that both manual and electrical operation cannot occur coincidently. A source of electric power is indicated at terminals 84. A manual switch 86 is provided in the line extending therefrom. Upon closing manual switch 86 the solenoid 88 forming a part of solenoid switch 58 is energized to move the core 90 downwardly as illustrated in Fig. 2. An annular groove 92 is provided in shaft 42 and when the annular groove 92 is aligned with core 90 the core moves downwardly to occupy the recess and to prevent axial motion of shaft 42. The motion of core 90 is in opposition to the coil spring 94. When the core 90 moves downwardly and the manual means is disengaged, a normally open switch 96 is closed which will provide energization for motor 14. Motor 14 will then drive the output shaft 30 in the manner already described. Thus, if the manual means is disengaged and the core 90 free to move into the recess 92 the motor may be energized to drive the output.

Conversely, if the manual means is in engagement with the output, the core 90 cannot move downwardly and the switch 96 remains open to prevent energization of motor 14. A sleeve 102 extends from the hub 50 of hand wheel 48 to enclose the coil spring 56 and to prevent injury to an operator which might otherwise result from engagement of his fingers between housing 44 and the hub 50.

While an entire driving system has herein been described utilizing both a manual and an electrical source of power the inventive concepts taught herein are not limited to this entire structure. The spur gear lock including only output gear 40 in combination with driving gear 52 and locking gear 54 are believed to have many useful purposes other than that described herein. For example the gear lock may be utilized to advantage in automotive window operating mechanisms, in engine starters, or in any application where it is desirable to automatically disengage a set of gears when the torque is removed therefrom. The entire system taught herein is believed additionally useful when the novel features of the spur gear lock are combined with the motor control system above described. These and other obvious embodiments and variations will immediately occur to one skilled in the art and all of the variations are believed to be within the scope of this invention.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two congruent gears normally in aligned relationship, one of said gears being angularly shiftable on said first shaft when in driving engagement with said single gear, and resilient means urging said gears to a relative position of disengagement with the nonshiftable gear of said set adjacent to said single gear.

2. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two conguent gears normally in aligned relationship, one of said gears being angularly shiftable on said first shaft when in driving engagement with said single gear, spring means normally maintaining the gears of said set in coincident relationship, and resilient means urging said gears to a relative position of disengagement with the nonshiftable gear of said set adjacent to said single gear.

3. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two congruent gears normally in aligned relationship, one of said gears being angularly shiftable on said first shaft through an angle generally equal to one-half the circular pitch of said gears when in driving engagement with said single gear, spring means normally maintaining the gears of said set in coincident relationship, and resilient means urging said gears to a relative position of disengagement with the nonshiftable gear of said set adjacent to said single gear.

4. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two congruent gears normally in aligned relationship, one of said bears being angularly shiftable on said first shaft through an angle between .2 and .8 of the circular pitch of said gears when in driving engagement with said single gear, spring means normally maintaining the gears of said set in coincident relationship, and resilient means urging said gears to a relative position of disengagement with the nonshiftable gear of said set adjacent to said single gear.

5. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two congruent gears normally in aligned relationship, one of said gears being angularly shiftable on said first shaft when in driving engagement with said single gear, spring means normally maintaining the gears of said set in coincident relationship, adjusting means engaging said spring means to control the normal angular relationship of the gears of said set, and resilient means urging said gears to a relative position of disengagement with the nonshiftable gear of said set adjacent to said single gear.

6. Coupling apparatus comprising a first rotatable shaft, a gear set secured to said shaft for rotation therewith, a second rotatable shaft mounted in parallel spaced relationship to said first shaft, manually engageable handle means secured to one of said shafts for rotation thereof, power output means secured to the other of said shafts, a single gear mounted on said second shaft for rotation therewith and engageable with said gear set, said gear set and said single gear being relatively shiftable axially, said gear set comprising two congruent gears normally in aligned relationship, one of said gears being angularly shiftable on said first shaft when in driving engagement with said single gear, spring means normally maintaining the gears of said set in coincident relationship, and resilient means urging said gears to a relative position of disengagement with the nonshiftable gear of said set adjacent to said single gear.

7. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said gear set and said single gear being relatively shiftable axially, said gear set comprising two congruent gears normally in aligned relationship, one of said gears being angularly shiftable on said first shaft through an angle generally equal to an odd multiple of one-half the circular pitch of said gears when in driving engagement with said single gear, spring means normally maintaining the gears of said set in coincident relationship, and resilient means urging said gears to a relative position of disengagement with the nonshiftable gear of said set adjacent to said single gear.

8. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said shafts being relatively shiftable axially, said gear set comprising two congruent gears normally in aligned relationship, one of said gears being angularly shiftable on said first shaft when in driving engagement with said single gear, and resilient means urging said gears to a relative position of disengagement with the nonshiftable gear of said set adjacent to said single gear.

9. Coupling apparatus comprising a first rotatable shaft, a gear set secured to said shaft for rotation therewith, a second rotatable shaft mounted in parallel spaced relationship to said first shaft, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shaft when in driving engagement with said single gear, spring means normally maintaining the gears of said set in coincident relationship, and resilient means urging said first shaft to a position in which said gears are disengaged and the nonshiftable gear of said set is disposed adjacent to said single gear.

10. A drive system selectively utilizing a hand wheel and an electric power source, said system comprising a first rotatable shaft operatively connected to said hand wheel, a gear set secured to said shaft for rotation therewith, a second rotatable shaft mounted in parallel spaced relationship to said first shaft and drivingly connected to said electric power source, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shaft when in driving engagement with said single gear, spring means normally maintaining the gears of said set in coincident relationship, and resilient means urging said first shaft to a position in which said gears are disengaged and the nonshiftable gear of said set is disposed adjacent to said single gear.

11. A drive system selectively utilizing a hand wheel and an electric power source, said system comprising a first rotatable shaft operatively connected to said hand wheel, a gear set secured to said shaft for rotation therewith, a second rotatable shaft mounted in parallel spaced relationship to said first shaft and drivingly connected to said electric power source, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shaft when in driving engagement with said single gear, solenoid means energized when said power source is energized to prevent driving engagement of said single gear and said gear set, spring means normally maintaining the gears of said set in coincident relationship, and resilient means urging said first shaft to a position in which said gears are disengaged and the nonshiftable gear of said set is disposed adjacent to said single gear.

12. A drive system selectively utilizing a hand wheel and an electric power source, said system comprising a first rotatable shaft operatively connected to said hand wheel, a gear set secured to said shaft for rotation therewith, a second rotatable shaft mounted in parallel spaced relationship to said first shaft and drivingly connected to said electric power source, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shaft when in driving engagement with said single gear, switch means positioned when said single gear and said gear set are in engagement to prevent energization of said power source, spring means normally maintaining the gears of said set in coincident relationship, and resilient means urging said first shaft to a position in which said gears are disengaged and the nonshiftable gear of said set is disposed adjacent to said single gear.

13. A drive system selectively utilizing a hand wheel and an electric power source, said system comprising a first rotatable shaft operatively connected to said hand wheel, a gear set secured to said shaft for rotation therewith, a second rotatable shaft mounted in parallel spaced relationship to said first shaft and drivingly connected to said electric power source, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shift when in driving engagement with said single gear, solenoid means energized when said power source is energized to prevent driving engagement of said single gear and said gear set, switch means positioned when said single gear set are in engagement to prevent energization of said power source, spring means normally maintaining the gears of said set in coincident relationship, and resilient means urging said first shaft to a position in which said gears are disengaged and the nonshiftable gear of said set is disposed adjacent to said single gear.

14. A drive system selectively utilizing a hand wheel and an electric power source, said system comprising a first rotatable shaft operatively connected to said hand wheel, a gear set secured to said shaft for rotation therewith, a second rotatable shaft mounted in parallel spaced relationship to said first shaft and drivingly connected to said electric power source, a single gear mounted on said second shaft for rotation therewith and engageable with said gear set, said first shaft being shiftable axially relative to said second shaft, said gear set comprising two congruent gears normally in aligned relationship, one of said gears being angularly shiftable on said shaft when in driving engagement with said single gear, solenoid means energized when said power source is energized to prevent driving engagement of said single gear and said gear set, switch means actuated by said solenoid to prevent energization of said power source when said single gear and said gear set are in engagement, spring means normally maintaining the gears of said set in coincident relationship, and resilient means urging said first shaft to a position in which said gears are disengaged and the nonshiftable gear of said set is disposed adjacent to said single gear.

References Cited in the file of this patent

UNITED STATES PATENTS 2,286,597   Bruckel et al. _____ June 16, 1942